Patented Aug. 29, 1944

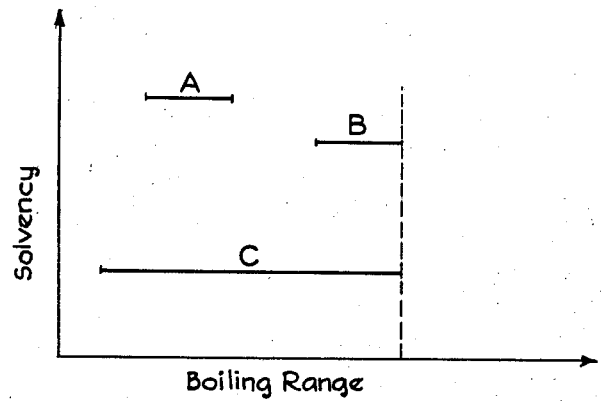
Fig. I
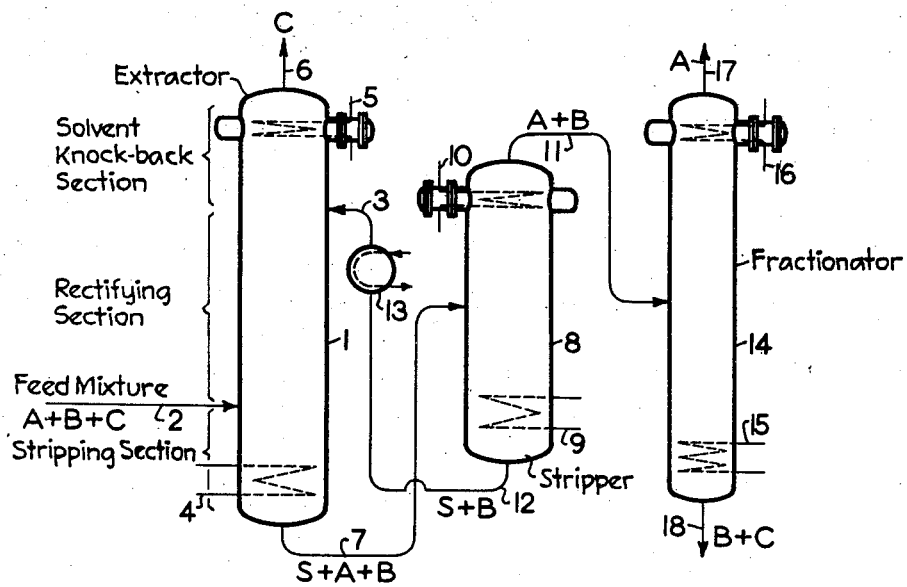
Fig. II
Inventors: Russell N. Shiras
Ava J. Johnson
By their Attorney:

2,357,028

UNITED STATES PATENT OFFICE 2,357,028

SOLVENT EXTRACTION PROCESS

Russell N. Shiras and Ava J. Johnson, Oakland, Calif., assignors to Shell Development Company, San Francisco, Calif., a corporation of Delaware Application August 4, 1943, Serial No. 497,406

16 Claims. (Cl. 202—67)

This invention relates to a new and improved process for separating vaporizable mixtures of different components by extractive distillation with a highly selective solvent. More particularly, it deals with the recycle of an extracted portion of said mixture with said selective solvent to act as a mutual solvent for said mixture and said selective solvent.

Ordinarily in extractive distillation processes to separate an individual compound from multi-component mixtures a narrow boiling range concentrate of that compound is prepared in order to produce as pure a product as possible. (See, for example, Dunn et al.—U. S. 2,288,126.) By the process of this invention much wider boiling range mixtures may be treated to produce relatively pure products thereby eliminating or reducing the requirements for accurate, tedious and expensive prefractionation.

Certain highly selective solvents have insufficient solvent power for some mixtures with the result that in the course of the extractive distillation two liquid phases are formed in the extraction zone. The presence of two liquid phases in this zone results in a poor separating efficiency and therefore maintenance of a single liquid phase is very desirable. Where there is a tendency to form two liquid phases, the addition of a mutual solvent for this selective solvent and feed being extracted may overcome the difficulty.

The use of such a mutual solvent in an extractive distillation may in addition have other advantages such as decreasing the temperature required in the reboiler and stripper, and increasing the selectivity of the selective solvent.

Secondary advantages often result from the above as follows: for example, a decrease in the reboiler temperature may decrease the thermal decomposition of selective solvent and the corrosion of the apparatus, improve the heat economy, and make possible the use of a large variety of selective solvents which because of their excessively high boiling temperatures could not otherwise be employed to advantage.

It is a broad purpose of this invention to separate in an economical, effective and efficient manner mixtures of similar organic compounds having different degrees of saturation or other mixtures otherwise difficultly separable having wide boiling ranges. Another purpose of this invention is to separate with a solvent of high selectivity two or more closely related components from a vaporizable mixture containing them. Another purpose is to produce in a substantially pure state at least one of the components separated from the mixture and to produce other components separated in high concentrations; for example, to produce nitration grade toluene and a xylene concentrate from a petroleum hydrocarbon distillate boiling between about 100° C. and 145° C. Further purposes of this invention are to increase the solubility of a mixture at its bubble temperature in a selective solvent of low solvent power so as to insure existence of a single liquid phase throughout the extraction zone without the addition of a mutual solvent derived from an outside source; to reduce the boiling temperature for stripping the rich solvent which descends through the extraction zone, thereby reducing the danger of thermal decomposition of said solvent; and to increase the efficiency of the extractive distillation still, etc.

This invention is based on the idea of utilizing a component contained in the mixture to be separated, to act as the mutual solvent. To achieve this, the process is made to comprise the following steps: (1) contacting the mixture with the solvent to produce a raffinate and an extract phase; (2) separating the raffinate from the extract phase; (3) stripping said extract phase under conditions to produce an extract distillate and a "residue" consisting essentially of said solvent and a relatively high boiling portion of the extract; (4) recycling said "residue" for recontact with said mixture; and (5) fractionating said distillate. The novelty of this invention lies in the choice of the particular mixture to yield a "residue" having certain properties, as well as in the control of the steps of the process to achieve this. Therefore, before describing the process in detail, it will be necessary to define more specifically the properties of the type of vaporizable mixtures which may be separated by the solvent, and the properties of the "residue" produced in step (3).

Many different types of mixtures of compounds may be separated by the selective solvents of this invention, provided the mixtures are vaporizable at temperatures substantially below the boiling temperatures of the selective solvent, are inert toward said solvent, and cannot be separated by ordinary fractional distillation alone. The mixture must contain at least three components which, for illustration, will be called components A, B and C, having the following boiling temperature and solvency relations:

A, B and C have as a rule overlapping boiling ranges, A boiling at a temperature sufficiently below that of B to make possible the separation of A from B by ordinary fractional distillation in the absence of substantial amounts of C. The presence of C prevents the separation of the mixture into its three components by ordinary fractional distillation without the selective solvent. C has a boiling temperature or range near that of A and/or B, which may reach as high as the boiling temperature of B but not substantially higher.

C is the component least soluble in the selective solvent at the temperature of extractive distillation, and conversely the selective solvent such as phenol, furfural, sulfolane, etc., must have a greater solvent power for components A and B than for component C at this temperature. In other words, in the presence of the selective solvent, A and B show less deviation from Raoult's law, and thus have a lower "escaping tendency," than C. By "escaping tendency" is meant the potential of one component to pass from one phase to another.

Thus the relation of the three components with regard to boiling temperature and solvency may be illustrated diagrammatically as shown in Figure I of the drawing, wherein boiling range and solvency are plotted as the abscissa and ordinate, respectively, in a co-ordinate system and the relative positions of A, B and C in this system are indicated by lines.

Each component A, B or C may consist of one or more compounds. By first extractively distilling the mixture in the presence of a selective solvent and then re-distilling the bottoms or extract in the absence of the solvent, a separation of these components can be achieved. This separation is such that at least concentrates of the several components are produced, and if certain highly selective solvents are employed as specified hereinafter at least one of the components may be separated in the substantially pure state.

Mixtures of A, B and C may include isomers and azeotropic mixtures, for example those present in hydrocarbon distillates having boiling ranges sufficiently wide to include hydrocarbons containing molecules having at least two consecutive numbers of carbon atoms; that is, for example, a hydrocarbon fraction containing molecules of 7 and 8 carbon atoms such as a fraction containing both toluene and xylenes, together with other non-aromatic hydrocarbons having boiling temperatures within the boiling ranges of these two aromatic compounds.

Some specific examples of mixtures which may be separated by the selective solvents of this invention are hydrocarbon mixtures such as mixtures containing butadiene, pentadiene and butylenes; pentanes, isoprene and piperylene; gasoline distillates containing benzene and toluene, or toluene, xylene and ethyl benzene, etc.; chlorinated hydrocarbons in hydrocarbon mixtures; mixtures of alcohols and esters and hydrocarbons; mixtures of alcohols and ethers and hydrocarbons; mixtures of acids and esters; mixtures of esters and hydrocarbons, etc. Still other mixtures are those containing oxy organic compounds such as primary and secondary butyl alcohols; methyl propyl ketone and diethyl ketone, etc. Other organic mixtures are those produced in various chemical processes of the coal, lignite and petroleum industries such as mixtures of organic sulfur compounds, containing hydrocarbon mixtures containing phenols, thiophenols and hydrocarbons and mixtures containing mono-, di- and trimethyl amines, etc.

As indicated before, the residue produced in step (3) of the process comprises essentially all of the solvent (which for convenience will be referred to as S) and a substantial portion of relatively high boiling extract, i. e. component B which, together with A, has been extracted from the mixture of A, B and C. Since B is more soluble in the solvent than C it acts as mutual solvent for C and S upon returning this residue to the top of the rectifying or extraction zone. The advantages of having a mutual solvent in this zone have already been recited.

The amount of component B left in the solvent S in step (3) will vary with the properties of the mixture to be separatetd and the properties of the solvent S, i. e. its solvent power and selectivity for A, B and C. The ratio of B to S in the residue must be at least enough to effect one or more of the purposes desired but should not be greater than about 1:1 because excessive quantities of component B normally tend to reduce unduly the selectivity of the solvent S by acting as a diluent, while smaller amounts frequently increase the solubility. The amount of B in the residue should range between about 5% and 50% and preferably between about 10% and 25% by volume.

Figure II of the drawing is an illustrative flow diagram of this process. The description of this figure for the purpose of illustration will be applied to the separation of a specific mixture, namely a petroleum hydrocarbon fraction boiling between about 100° C. and 145° C., containing toluene (component A), xylenes (component B), and non-aromatics (component C). This hydrocarbon fraction is introduced into the side of extractor 1 through line 2, wherein it is continually contacted in the vapor phase with a liquid containing the solvent S such as a sulfolane (which will be described later) introduced into the extractor through line 3, above line 2. The extractor is divided into three sections: (a) the stripping section at the bottom of the extractor below line 2, provided with reboiler 4, wherein the undissolved non-aromatic hydrocarbons are stripped from the sulfolane containing dissolved toluene and xylenes; (b) the rectifying section (or extraction zone) in the center of the extractor 1 between lines 2 and 3, wherein the rising vapors of the hydrocarbons are countercurrently contacted with the descending liquid solvent; and (c) the solvent knockback section at the top of extractor 1 above line 3 provided with a reflux condenser 5 wherein solvents that may vaporize are knocked back out of the rising vapors of non-aromatics. In extractor 1 there is produced a raffinate consisting essentially of non-aromatics withdrawn through top line 6 and an extract phase consisting essentially of sulfolane, toluene, and xylenes, withdrawn through bottom line 7.

This extract phase in line 7 then passes into stripper 8, wherein it is fractionally distilled. Stripper 8 is provided with reboiler 9 at its bottom and reflux condenser 10 at its top, and is controlled in such a manner that substantially all toluene and a portion of xylenes are removed from the sulfolane to produce a distillate consisting of toluene and xylenes withdrawn through top line 11. A residue consisting of sulfolane and the remaining portion of the xylenes is withdrawn through line 12. The amount of xylenes left in the sulfolane in stripper 8 depends upon the various considerations and requirements discussed earlier. 2,4-dimethyl sulfolane, for example, has a relatively low solvent power for non-aromatic hydrocarbons which causes the formation of two liquid layers in the rectifying section. The presence of sufficient amounts of xylene prevents this difficulty, about 15% by volume of xylene in the sulfolane being the minimum required. The residue is withdrawn from stripper 8 through bottom line 12 and passed through cooler 13 and joined with line 3 for introduction into extractor 1.

The distillate from stripper 8 containing substantially all of the toluene, and that portion of xylenes not recirculated, is then passed through line 11 into fractionator 14 provided with reboiler 15 at its bottom and reflux condenser 16 at its top. This distillate also may contain a minor amount of the relatively high boiling portion of the non-aromatics which were not included in the overhead vapor from the extractor 1. Therefore, it is important that the feed for the extractor 1 through line 2 be substantially free from non-aromatics having higher boiling temperatures than the xylenes. In the absence of the lower boiling portion of the non-aromatics, relatively pure toluene is readily separable by fractional distillation of this distillate. The fractionator 14 is operated in such a manner as to take overhead the toluene and to leave a bottom product representing a xylene fraction which may contain varying, though small, amounts of non-aromatics having the same or similar boiling temperatures as the xylenes. The toluene is withdrawn from the top of fractionator 14 through line 17, and the xylene fraction is withdrawn through bottom line 18.

The described extractive distillation may be carried out either adiabatically or isothermally.

The apparatus employed in this process may be of any conventional or convenient type known in the art. For simplicity, the drawing does not show all the pumps, tanks, heat exchangers, valves, bypasses, vents, reboilers, condensers, coolers and other auxiliaries which may be necessary for the proper operation of the process, but the inclusion of which will be evident to those skilled in the art.

Generally, the temperature maintained during the extractive distillation with a selective solvent may be between fairly wide limits provided it is above the bubble temperature of the mixture and sufficiently below the boiling temperature of the solvent, under the pressure maintained in the extractor, to control the desired amount of component B for recycle through lines 12 and 3 to extractor 1. Subatmospheric pressure may be resorted to in order to reduce the temperature, if the mixture to be separated is not thermally stable at higher temperatures. Suitable temperatures may range from about 0° C. up to about +350° C. at pressures from about 0.1 lb. p. s. i. absolute up to about 500 lbs. p. s. i.

Useful solvent-to-feed ratios in extractor 1 may range from about ½ to about 20 by volume and preferably not more than about 5.

The selective solvent S should be at least as selective as phenol or furfural, and preferably more selective. Further, it must be stable at the stripping temperature maintained in the stripping section of the extractor, i. e. it must be sufficiently heat-stable so that it may at least partially vaporize without decomposition in the presence of the components of the mixture, and must have a boiling temperature higher than that of component B of the mixture. It also should not crystallize out of solution at the highest concentration which may occur at any point of the process say at a temperature of 150° C. It is desirable that it be not more than 50% by volume soluble in kerosene having a Watson characterization factor of at least 12. (Ind. Eng. Chem., 27, p. 1460, Dec. 1935, "Characterizations of petroleum fractions," by K. M. Watson, E. F. Nelson and George B. Murphy.) Higher solubility in such kerosene frequently is an indication of poor selectivity.

The solvent S may consist of a single compound or a mixture of one or more auxiliary solvents or compounds which will not react with the mixture to be separated and will not separate from each other during the stripping step. In other words, all of the components that make up the solvent S must have a boiling temperature above that of component B.

Organic selective solvents which contain less than 14 carbon atoms per molecule and have melting points below about 100° C. are generally preferred. Some suitable specific solvents are: phenol, cresylic acids, alkyl phenol mixtures; aniline, alkyl anilines, diphenyl amine, ditolyl amines; carbitols (diethylene glycol mono ethers) such as methyl, ethyl, propyl carbitols; chlorinated dialkyl ethers such as beta-beta-dichlorethyl ether; nitrobenzene, nitrotoluene, nitroxylenes; naphthols, alkyl naphthols; benzophenone, phenyl tolyl ketone, diphenylene ketone; alkyl phthalates such as dimethyl phthalate; alkyl salicylates such as methyl salicylate; benzyl alcohol; benz chlorides, i. e. benzyl, benzal, benzo-chlorides; benzonitrile; diphenyl oxide, substituted diphenyl oxide which may contain amino, nitro, hydroxy, etc., radicals; ditolyl oxide, substituted ditolyl oxides which may contain amino, nitro, hydroxy, etc. radicals; hydroxy pyridine, nitro pyridine, chlorinated pyridines; substituted quinolines, isoquinoline, chlorinated quinoline, such as hydroxy quinoline, 5-nitroquinoline, quinaldine, beta-alpha picoline, alpha picoline, refinery N-bases; tetrahydrofurfuryl alcohol, furfuryl alcohol, furfural; monoglycerol ethers such as 1-methoxy glycerol, 1-ethoxy glycerol, 1-propoxy glycerol, 1-isopropoxy glycerol, etc.; glycerol diethers such as 1,3-dimethoxy glycerol, 1,3-diethoxy glycerol, 1,3-dipropoxy glycerol, 1,3-di-isopropoxy glycerol; mixed diglycerol ethers; antimony trichloride; crotonaldehyde, acrolein; various aliphatic sulfones such as diethyl, dipropyl, dibutyl, and mixed sulfones; aliphatic sulfolanes, including 2-, 3-, 4-, and/or 5-alkyl and/or alkenyl sulfolanes; alicyclic sulfolanes such as cyclopentyl or cyclohexyl sulfolane; aryl and aralkyl sulfolanes; sulfolanyl ethers, sulfolanyl sulfides, sulfolanols, sulfolanyl esters, sulfolanyl amines, sulfolanyl amides, certain sulfolanyl halides and so forth; 2-sulfolenes corresponding to the above-mentioned sulfolanes; sulfoxides such as dialkyl sulfoxides and so forth. The above solvents may be used alone or in mixtures of two or more and/or with other auxiliary solvents.

A sulfolane may be made by condensing a conjugated diolefin with sulfur dioxide and then subjecting the resulting product to hydrogenation, alkylation, hydration and/or other substitution or addition reactions. A 2-sulfolene may be made similarly by isomerizing instead of by hydrogenating the product resulting from condensing a conjugated diolefin with sulfur dioxide. Unsubstituted sulfolane has the formula:

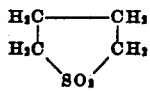

and 2-sulfolene has the formula:

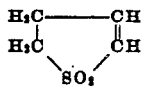

If substantially pure A is desired the solvent S must have sufficient selectivity that at about a 50% concentration of the solvent with the mixture the volatility ratio or "alpha value" relative to A of the heaviest constituent of C which can azeotrope with A in the absence of the solvent, is at least about 1.3 and preferably 1.5 or more. The volatility ratio or "alpha value" is the ratio of the content of C in the vapor to the content of C in the liquid divided by the ratio of content of A in the vapor to content of A in the liquid at the extracting temperature of the mixture. Thus, the "alpha value" is a direct measure of the selectivity of the solvent and the greater this value the greater its selectivity.

Some solvents which have this high selectivity for separating aromatics from non-aromatic hydrocarbons are: sulfolane, 3-methyl sulfolane, 2,4-dimethyl sulfolane, 2-sulfolene, 2,4-dimethyl-4-sulfolane, methyl 3-sulfolanyl ether, ethyl 3-sulfolanyl sulfide, methyl aryl 3-sulfolanyl ether, n-aryl 3-sulfolanyl amine, 3-sulfolanyl acetate, sulfolanyl, and others.

We claim as our invention:

1. In an extractive distillation process with a relatively high boiling selective solvent for separating a vaporizable mixture of three components A, B and C which cannot be separated from one another by fractional distillation alone, A and B being more soluble in said solvent than C, A being sufficiently more volatile than B to be separable from B by fractional distillation in the absence of C, and C boiling at a temperature at or near the boiling temperatures of A and B but not substantially above that of B, the steps comprising contacting said mixture at a temperature above its boiling temperature with said liquid solvent which contains a substantial amount of B, to produce a raffinate containing C and an extract containing A and B in said solvent, separating said raffinate and extract, stripping said extract under conditions to produce a residue comprising said solvent and containing between about 5% and 50% by volume of B, and a distillate containing A and the remainder of B, returning said residue for recontact with said mixture, and fractionating said distillate to separate A and B.

2. The process of claim 1 wherein said mixture consists of organic compounds.

3. The process of claim 1 wherein said mixture comprises predominantly hydrocarbons.

4. The process of claim 1 wherein said mixture consists of organic compounds of different degrees of saturation.

5. The process of claim 1 wherein said solvent-to-mixture ratio ranges between ½ and 20 by volume.

6. In an extractive distillation process with a relatively high boiling selective solvent for separating a vaporizable mixture of three components A, B and C, which cannot be separated from each other by fractional distillation alone, A and B being more soluble in said solvent than C, A being sufficiently more volatile than B to be separable from B by fractional distillation in the absence of C, and C boiling at a temperature at or near the boiling temperatures of A and B but not substantially above that of B, the steps of contacting said mixture at a temperature above its boiling temperature with said liquid solvent which contains a substantial amount of B, to produce a raffinate containing a major portion of C and an extract containing A, B, and the remaining minor portion of C in said solvent, separating said raffinate and extract, stripping said extract under conditions to produce a residue comprising said solvent and containing between about 5% and 50% by volume of B and a distillate containing A, the remainder of B and said minor portion of C, returning said residue for re-contact with said mixture, and fractionating said distillate to separate substantially pure A and a concentrate of B containing said minor portion of C.

7. In an extractive distillation process with a relatively high boiling selective solvent for separating a vaporizable mixture of three components A, B and C which cannot be separated from each other by fractional distillation alone, A and B being more soluble in said solvent than C, A being sufficiently more volatile than B to be separated from B by fractional distillation in the absence of C, and C boiling at a temperature at or near the boiling temperatures of A and B but not substantially above that of B, the steps of contacting said mixture at a temperature above its boiling temperature with said liquid solvent which contains a substantial amount of B to produce a raffinate containing a major portion of C and an extract containing A, B and the remaining minor portion of C in said solvent, said solvent being such that in about a 50% concentration of the solvent with the mixture a volatility ratio is produced between A and the heaviest constituents of C which can azeotrope with A in the absence of the solvent of at least 1.3, separating said raffinate and extract, stripping said extract under conditions to produce a residue comprising said solvent and containing between about 5% and 50% by volume of B, and a distillate containing A, the remainder of B, and said minor portion of C, returning said residue for re-contact with said mixture and fractionating said distillate to separate substantially pure A and a concentrate of B containing said minor portion of C.

8. The process of claim 7 wherein said volatility ratio is at least 1.5.

9. The process of claim 7 wherein said highly selective solvent is a sulfolane.

10. The process of claim 7 wherein said highly selective solvent is unsubstituted sulfolane.

11. The process of claim 7 wherein said highly selective solvent is a hydrocarbon-substituted sulfolane.

12. The process of claim 7 wherein said highly selective solvent is a 2-sulfolene.

13. The process of claim 7 wherein said mixture is a petroleum concentrate boiling between about 100° C. and 145° C.

14. The process of claim 7 wherein said mixture is a hydrocarbon concentrate boiling between about 100° C. and 145° C. and component A is toluene and component B consists essentially of xylenes.

15. In a continuous extractive distillation process with a relatively high boiling selective solvent for separating a hydrocarbon distillate boiling between about 100° C. and 145° C., and containing toluene and xylenes, said solvent having a greater solvent power for said toluenes and xylenes than for the remaining portion of said distillate, the steps comprising contacting said distillate at a temperature above its bubble temperature with a liquid solvent comprising a sulfolane and about 15% by volume of xylenes, to produce a raffinate containing said remaining portion of said distillate and an extract containing toluene and xylenes in said solvent, separating said raffinate and extract, stripping said extract under conditions to produce a residue comprising said solvent containing about 15% by volume of said xylenes, and a distillate containing toluene and the remainder of said xylenes, returning said residue for a re-contact with said mixture, and fractionating said distillate to separate toluene and xylenes.

16. The process of claim 15 wherein said sulfolane is 2,4-dimethyl sulfolane.

RUSSELL N. SHIRAS.
AVA J. JOHNSON.